Dec. 24, 1957 W. J. WEINFURT ET AL 2,817,247
REMOTE CONTROL DEVICE
Filed Oct. 5, 1954 6 Sheets-Sheet 1

INVENTORS.
WILLIAM J. WEINFURT
EDMUND J. STRAMOWSKI
BY Ralph G. Hohenfeldt
ATTORNEY

Dec. 24, 1957 W. J. WEINFURT ET AL 2,817,247
REMOTE CONTROL DEVICE
Filed Oct. 5, 1954 6 Sheets-Sheet 3

INVENTORS.
WILLIAM J. WEINFURT
EDMUND J. STRAMOWSKI
BY Ralph G. Hohenfeldt

ATTORNEY

United States Patent Office 2,817,247
Patented Dec. 24, 1957

2,817,247

REMOTE CONTROL DEVICE

William J. Weinfurt, Wauwatosa, and Edmund J. Stramowski, Milwaukee, Wis., assignors to McGraw-Edison Company, a corporation of Delaware Application October 5, 1954, Serial No. 460,316

9 Claims. (Cl. 74—502)

This invention relates to mechanism which may be adapted to electrical switches for operating them from a position remote from the situs of their installation. The invention has particular application to oil circuit reclosers of the type illustrated in considerable detail in U. S. Patent No. 2,560,831 to Van Ryan et al. which is assigned to the assignee of this invention.

An oil circuit recloser may be connected in the main lines of a distribution system in back of a number of sectionalizing switches through which various branch circuits are supplied. Then, in a well known manner, the current responsive recloser automatically opens its circuit in response to a fault occurring in any one of the branch circuits. If the fault is of short duration only, the recloser will reset itself in closed position after momentarily interrupting the circuit; but, if the fault persists, the recloser will trip a number of times, usually four, and finally lock out of the circuit permanently. Subsequent to repairing or clearing of the fault which caused lockout, it is necessary to manually restore the recloser to closed circuit position by means of manipulating its operating handle with a hook stick.

Restoring the recloser to closed circuit position after the circuit fault has been corrected is, of course, a simple operation by itself, but great inconvenience is often encountered where the recloser is at an immense distance from the point at which the line crew has repaired the fault or at a distance from the line crew's base of operation. Under such circumstances the electric line outage may be unduly prolonged by delay in getting to the recloser for the purpose of resetting it. In fact, the delay may be intolerably long where the recloser is virtually inaccessible by reason of all normal transit routes thereto being snowbound or otherwise blocked by adverse weather conditions as is frequently the case in isolated areas in the more remote sections of the country. Such circumstances, beside being an obvious inconvenience to power consumers, represent a serious loss of revenue to the utility company providing the electrical power.

To overcome the above noted inconveniences and disadvantages it is proposed to provide reclosers with a simple auxiliary remote control mechanism which enables restoration of the recloser to closed circuit position by any unskilled person without requiring that person to climb a pole or expose himself to high voltages and without using a hook stick. Within these objectives, when an outage occurs, it is merely necessary to telephone a farmer or any other person who is properly instructed and conveniently located with respect to the recloser, to restore power to the distribution lines. Hence, power may be restored after minimum outage time and reductions in labor cost and revenue loss will be effected.

It should be appreciated that an oil circuit recloser is equipped with an operating handle which must be free to swing when the recloser locks out due to a predetermined number of overload shots and that any remote control device arranged for actuating the handle must not impair its ability to trip freely.

It is a general object of this invention to provide a device which may be readily adapted to an electrical apparatus of the nature outlined so that it may be manually operated from a position remote therefrom by an unskilled operator so that line outage time may be minimized.

Another important object is to design the remote control device so that it will not retard or impair normal operation of the apparatus to which it is applied.

A further object is to provide a remote control device which is easily installed on existing equipment and of such low cost as to be justified economically.

These and other objects will be more apparent when considered in conjunction with the following specification and the drawings in which.

Figure 1:
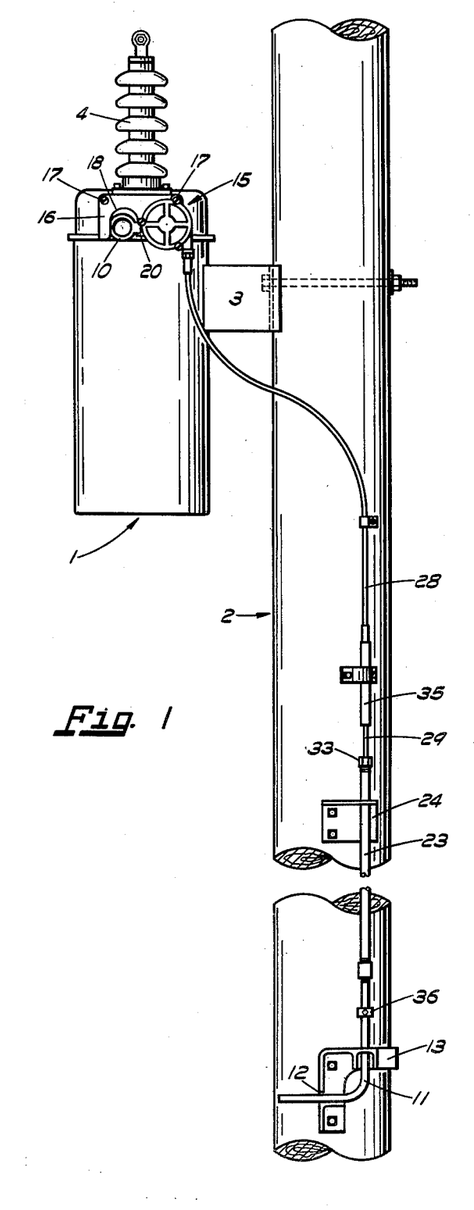
Fig. 1 is an elevational view of an oil circuit recloser installation embodying the invention.

For a general understanding of the invention refer to Fig. 1 which illustrates an oil circuit recloser 1 supported at a considerable height above ground level on a wood pole 2 by means of a suitable bracket 3. A bushing such as that designated by reference numeral 4 is provided for connecting the recloser to the protected power line (not shown). For one form of internal recloser construction reference may be made to the patent cited hereinabove, but for explaining the invention it is merely necessary to understand that each recloser 1 is provided externally with an eyeleted operating handle 10 which is carried by a shaft (not shown) pinned to the internal mechanism of the recloser 1. After recloser 1 has opened its contacts a predetermined number of times, it will permanently lock out of the circuit and handle 10 will swing downwardly, in a manner clearly apparent in Fig. 6, giving visual indication that such is the case.

Restoration of the recloser 1 to closed circuit condition may be accomplished by grasping a control handle 11 situated near the base of pole 2 and rotating the handle out of neutral positioning slot 12 in handle bracket 13 until it lies in a plane nearly radial to the pole 2. When disposed in slot 12 control handle 11 is in what is designated neutral position. After release from the slot, handle 11 is free for movement longitudinally above and below neutral position.

Translatory movement of handle 11 is ultimately converted to rotational movement for actuating eyeleted handle 10 on the recloser 1 through the medium of a lost motion mechanism embodied in the remote control device indicated generally by reference numeral 15. The control device 15 is provided with a mounting base plate 16 for securing the former to the recloser 1 by means of screws 17. A conventional recloser is provided with a sleet hood having an open bottom for protecting eyeleted handle 10 and the hood or housing has a side plate of conformation similar to base plate 16 so that plate 16 may be substituted therefor without difficulty. Access to the eyeleted handle 10 is gained through a U-shaped notch 18 in base plate 16 when it is desired to manipulate the eyelet by means of a hook stick.

Figure 5:
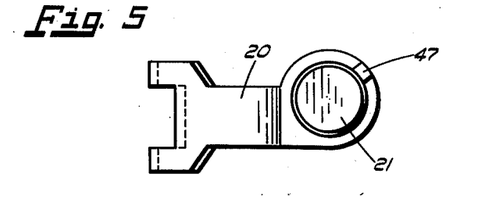
Fig. 5 represents an operator arm useable with various forms of the invention.

A bifurcated arm 20, shown in detail in Fig. 5, is utilized for coupling the remote control device 15 to the eyeleted recloser handle 10 by straddling the handle. Arm 20 swings with spindle 21, it being permanently affixed thereto by staking of any other well known means.

Figure 2:
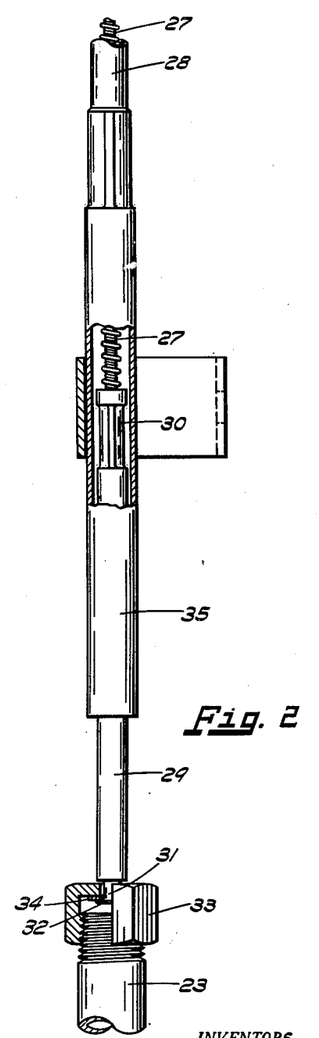
Fig. 2 is a fragmentary detailed view, partly in section, showing means for connecting the flexible control cable to the rigid control handle.

Driving force is transmitted to remote control device 15 from control handle 11 through intermediate cable means, partly rigid and partly flexible. Referring to Figs. 1 and 2 it will be seen that control handle 11 is threadingly coupled to a pipe 23 of length commensurate with the height of the recloser 1 above ground level. The pipe is guided in the vertical plane by a perforated guide bearing bracket 24 at one end and the handle bracket 13 adjacent the handle 11.

A flexible non-kinking cable 27 freely slidable in a protective covering sheath 28 serves to transmit movement of pipe 23 to remote device 15. Pipe 23 is connected to cable 27 through the medium of an intermediate rod like member 29. A socketed end 30 of the rod like member 29 receives cable 27 and the rod 29 is crimped to cable 27 to provide a permanent joint. The other end of rod 29 has a shouldered end portion 31 of reduced diameter for passing freely through the internally threaded hexagon adapter nut 33. The adapter nut is retained on the end portion 31 by peening at 32 or by other suitable means. A loosely fitting washer 34 is provided to increase the bearing area between peened end 32 and adapter nut 33. Hence, it should be evident that rod 29 and cable 27 may slide in response to movements of pipe 23 within weather shield tube 35 within limits established in one respect by stop collar 36 fastened to control handle 11.

Although not shown in the drawings, those versed in the art will appreciate that safety requirements dictate the necessity of grounding recloser tank 1 and all elements associated with control lever 11. Grounding methods are so well known as to obviate their discussion here.

Refer now to Figs. 3 through 7 in conjunction with the following more detailed explanation of one embodiment of a lost motion type, free tripping remote control device. For clarity, the cover 40, normally secured to the cylindrical housing 41 through the medium of screw holes 42, has been removed in Fig. 3. Housing 41 is seen to include a bottom 43 which has spindle shaft 21 journaled therein for rotation. One end of the spindle 21 extends outwardly from bottom 43 and receives bifurcated arm 20 as explained hereinbefore. A pliable washer 44 aids in preventing contaminants from following along spindle 21 into housing 41.

Figure 3:
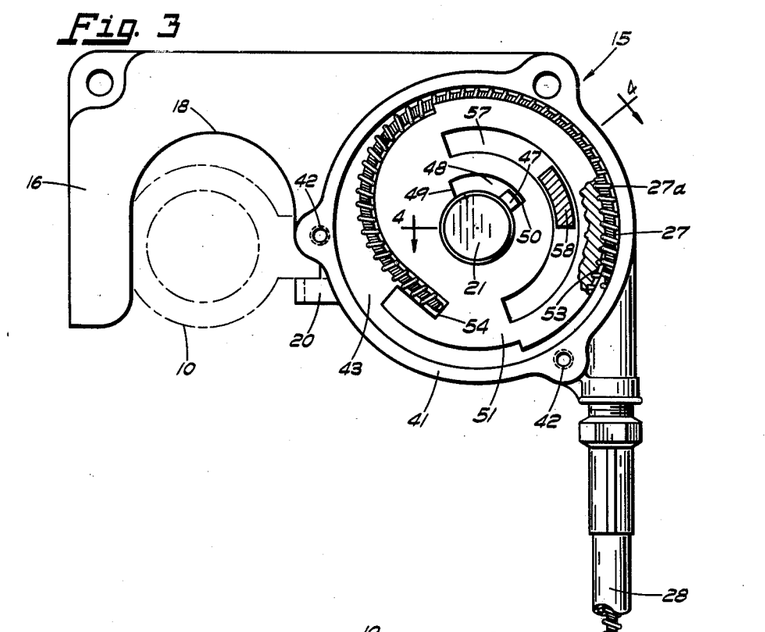
Fig. 3 represents a preferred embodiment of the invention with parts removed.
Figure 4:
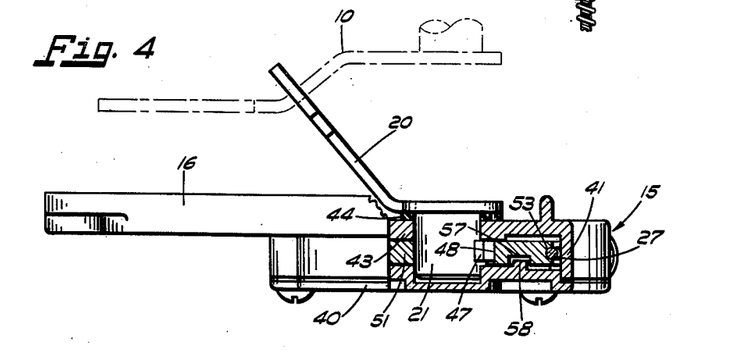
Fig. 4 is a top view of Fig. 3, partially in section, taken on the lines 4—4 thereof.

Spindle 21 is driven rotationally through the medium of a lug 47 which, in this form of the invention, projects radially into a crescent shaped slot 48 and into the path of walls 49 and 50 defining the slot. The lug 47 projecting between walls 49 and 50 constitutes a lost motion connection between spindle 21 and the driving member, termed sector plate 51.

Sector plate 51 serves to convert the translatory movement of flexible cable 27 into rotational movement. Sector 51 is journaled for rotation within limits on spindle 21.

Fig. 3 clearly illustrates how cable 27 is positively meshed to sector 51 by it lying in a semi-circular groove 53 in the peripheral margin of the sector, which groove is provided with recessed threads for receiving the outer spiral wire 27a of cable 27. It will be noted that cable 27 is retained in the groove 53 by the concentric walls of housing 41 and that the end of cable 27 is anchored in a notch 54 in the sector plate. Cable 27 is prevented from completely unwrapping from sector 51 by means of a stop 58 carried by cover 40 and projecting into a curved channel 57 spaced radially from spindle 21 in sector plate 51.

In considering the operating mode of the remote control device it should be borne in mind that eyeleted handle 10 of recloser 1 must be capable of swinging downwardly counterclockwise in Fig. 3 with a snap action in response to a predetermined number of overload shots through the recloser and that the remote control device is not permitted to burden the reclosed handle whatever.

Figures 6, 7, 8, 9:
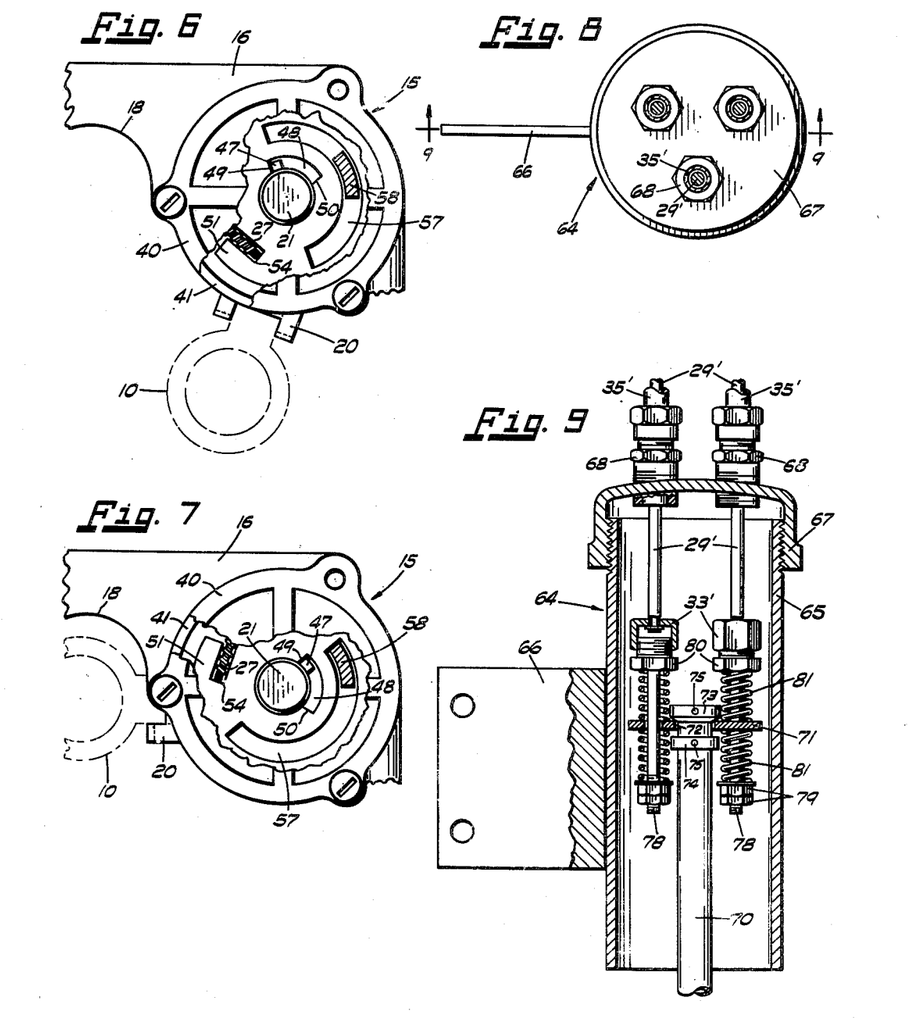
Fig. 6 illustrates the position of the parts after the recloser has opened automatically.
Fig. 7 illustrates the position of the parts after the recloser has been manually restored to closed position, but before the remote control device has been placed in neutral position.
Fig. 8 is a plan view of an equalizer for simultaneously remotely controlling a plurality of reclosers.
Fig. 9 is an elevational sectional view taken on the line 9—9 of Fig. 8.

Fig. 3 shows the position of eyeleted handle 10 when the recloser 1 is closed and with the manual control handle 11 in neutral position by virtue of residing in neutral positioning slot 12. Note that lug 47 projecting from spindle 21 is contacting wall 50 of crescent slot 48. If eyeleted handle 10 trips and rapidly rotates counterclockwise, as is the case subsequent to a sustained overload, spindle 21 will rotate in the same direction as a result of force transmitted through bifurcated arm 20. Upon this event lug 47 will swing unretarded to near contact with wall 49 of slot 48 as seen in Fig. 6. Of course, lug 47 will not abruptly strike wall 49 because the central angle of crescent slot 48 is greater than the swing angle of eyeleted handle 10, the latter angle being commonly about 70 degrees. It is to be especially noted that sector 51 has not moved angularly between Figs. 3 and 6 so that recloser handle 10 has not been burdened by any frictional drag of flexible cable 27.

Assuming that the line fault causing circuit interruption has been repaired, the line crew may avoid a trip to the recloser by merely telephoning a person near it, such as a farmer, who has been provided with a key for an anti-tampering lock (not shown) and ask him to reclose the circuit.

Reclosing the circuit is accomplished by manually swinging control handle 11 out of neutral slot 12 in handle bracket 13 and urging the handle 11 downwardly until stopped by collar 36. This operation causes sector 51 to rotate clockwise until it attains the position indicated in Fig. 7 where it is also seen how wall 49 of crescent shaped segmental slot 48 has abutted lug 47 to cause clockwise rotation of eyeleted handle 10 and accomplish closing of the electrical circuit being protected. When the control handle 11 is in its lowermost position, sector 51 is disposed as seen in Fig. 7. Consequently, handle 11 must be raised and swung into neutral positioning slot 12 so that the sector 51 will return to the position of Fig. 3 although no interchange of motion from the sector 51 to lug 47 will occur.

When it is necessary to disconnect an electrical circuit for maintenance or further construction, an unskilled person may likewise be called upon to trip recloser handle 10 for that purpose. This is done by starting from a condition depicted by Fig. 3, and merely raising control handle 11 above neutral position so that sector 51, through wall 50, urges lug 47 counterclockwise until eyeleted handle 10 trips. Hence, it is seen that the invention enables automatic and manual opening, and manual closing of a recloser from a remote station.

In certain installations individual reclosers are connected in each phase of a distribution line and it becomes desirable to operate them simultaneously from a single station. For this purpose the equalizer assembly 64 illustrated in Figs. 8 and 9 of the drawing is provided. Fig. 9 shows a cylindrical enclosure 65 having a hanger bracket 66 welded thereto for supporting the enclosure adjacent a pole such as 2 of Fig. 1. A water tight cap 67 is threaded on the enclosure 65, but the bottom of the latter may remain open.

Parts which are utilized with the single phase assembly described heretofore and duplicated in the polyphase arrangement of Figs. 8 and 9 now being described are designated by primed reference numerals in the figures cited. Hence, it may be seen that connections from a plurality of remote control devices may be made by admitting the weather shield 35' from each cable assembly through a common type of water tight packed compression gland 68 screwed into cap 67 so that the individual adapter members 29' project into enclosure 65. Members 29' are moved simultaneously linearly by means of a pipe shaft 70 through suitable equalizing mechanism to be described shortly hereinafter. Pipe shaft 70 may be provided with a control handle and bracket such as 11 and 13 respectively of Fig. 1.

At one end, pipe shaft 70 loosely penetrates an equalizer plate 71 through a central aperture 72, the plate being held in connection with shaft 70 by two spaced collars 73 and 74 fastened thereto by any suitable means such as dowel pins 75. Each cable assembly is attached to the equalizer plate 71 through an adapter nut 33' screwed onto a stud 78. Studs 78 are threaded at one end for receiving hexagonal jam nuts 79 and near the other end they have a threaded hexagonal shoulder portion 80. Studs 78 are surrounded by compression springs 81 interposed between each side of equalizer plate 71 and the shoulder portion 80 and jam nuts 79, respectively for creating a resilient connection between studs 78 and the plate 71. Springs 81 tend to cause all the adapter rod members 29' to move an equal distance linearly when pipe shaft 70 is raised or lowered equalizing or distributing the frictional drag of each flexible cable among the others through the medium of the springs.

Manually controlling a plurality of reclosers from a single station by means of an equalizer assembly 64 is conveniently accomplished by merely raising or lowering a single pipe 70 so that recloser handles 10 each attain the desired position simultaneously.

In Figs. 10 through 13 is shown a remote control device 90 having a lost motion mechanism of somewhat different structure than that described hereinabove but incorporating the novel free tripping principle. The modified device includes a mounting plate 91 for fastening the remote control mechanism 90 to an oil circuit recloser in proximity with an eyeleted operating handle 10 by means of screw holes 92 of which only one is visible in Fig. 10 and with a bifurcated arm 20 arranged to straddle handle 10 for mechanically coupling the two elements together.

The lost motion mechanism is carried within a rimmed annular housing 93 rigidly secured to mounting plate 91 by machine bolts 94. Annular housing 93 has an integrally cast plate like bottom 95 and a substantially parallel longitudinally spaced cover plate 101 which in combination provide a bearing support for a spindle 116 in a manner readily understandable from inspection of Fig. 11.

Figure 10:
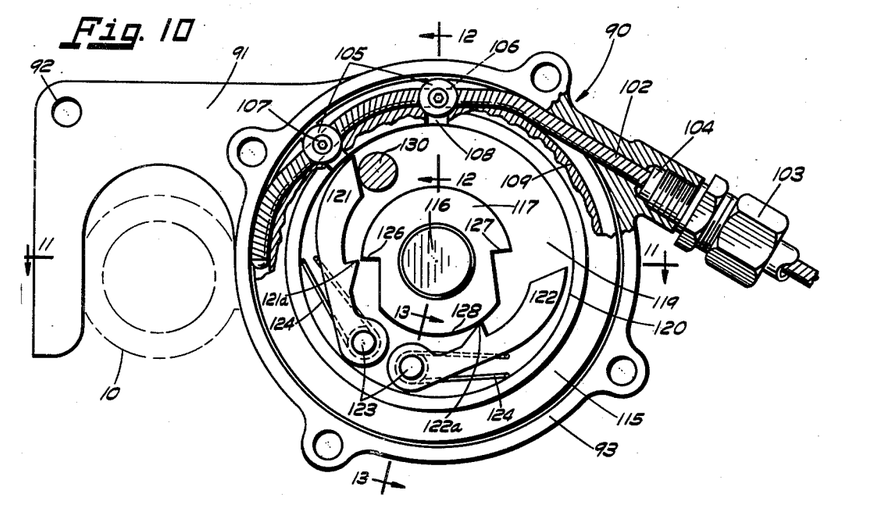
Fig. 10 represents the invention in modified form, partially in section and with parts removed.
Figure 11:
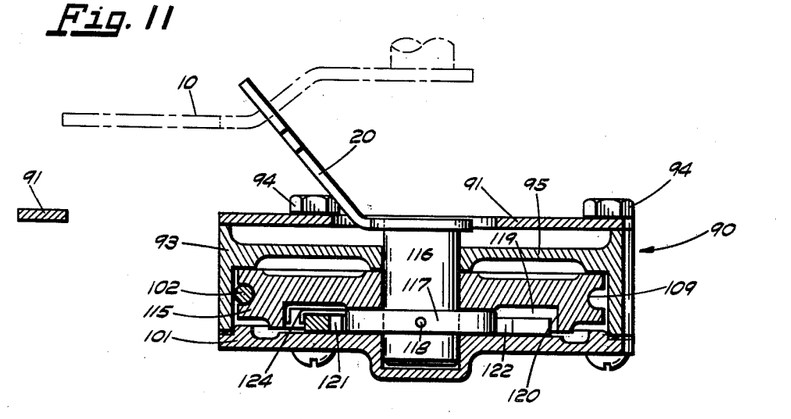
Fig. 11 is a sectional view taken on the line 11—11 of Fig. 10.
Figure 12:
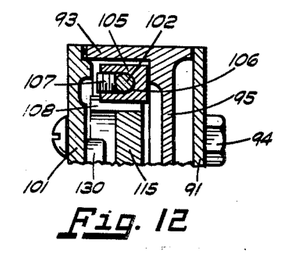
Fig. 12 is a partial sectional view taken on the line 12—12 of Fig. 10.
Figure 13:
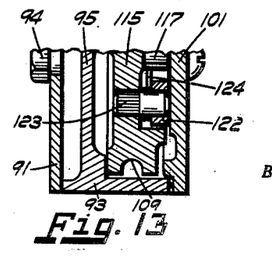
Fig. 13 is a partial sectional view taken on the line 13—13 of Fig. 10.

A control cable 102 enters housing 93 freely slidable in weather shield 104 which is in turn sealably compressed by a water tight fitting 103. Cable 102 is connected to the mechanism within housing 93 through the medium of cylindrical knobs 105 perforated diametrically by a hole 106 for receiving cable 102 and clamped thereto by socket head set screws 107 directed toward the cable. Cylindrical knobs 105 reside within radial slots 108 for positive engagement with a driving member in the form of actuator plate 115 and the cable itself lies deeply within a U-shaped groove 109 in the peripheral margin of plate 115. Hence, cable 102 may wrap around plate 115 without dragging against housing 93 when the plate turns.

Actuator plate 115 is adapted to turn in response to longitudinal movement of flexible control cable 102, thereby converting linear movement of the latter into rotational movement of the former.

The free tripping lost motion mechanism includes actuator plate 115 which is journaled directly on spindle 116 and retained in longitudinal position thereon by interposition between housing bottom plate 95 and a hub member 117 affixed to the spindle by a pin 118. Driving member or actuator plate 115 has a cylindrical central recess 119 in one face which is defined by peripheral wall 120 for the purpose of accommodating a pair of pawls 121 and 122. These pawls are carried pivotally on pins 123 which are driven into plate 115 as clearly shown in Fig. 13. A suitable torsion spring 124 surrounds each pin 123 to bias each pawl toward hub 117 at all times. Peripheral wall 120 limits the swing of the pawls away from hub 117. Hence, it is apparent that pawls 121 and 122 rotate with actuator plate 115 in response to linear movement of cable 102.

Hub 117 is milled out to create a pair of radially projecting shoulder lugs 126 and 127 for enabling alternate engagement and disengagement thereof by the pawls in accordance with the rotational direction of the actuator plate 115. As is evident in Fig. 10, the points 121a and 122a of the respective pawls positively catch the respective lugs 126 and 127, when plate 115 is rotated, because of the action of spring 124. Cover plate 101 is provided with a projecting boss 130 disposed in the rotational path of the pawls so that at a predetermined position of actuator 115, one or the other pawl will be disengaged from hub 117 so that eyeleted handle 10 may swing unimpaired.

The control device 90 is operated simply by urging cable 102 in one direction or the other. Fig. 10 shows the device when the eyeleted operating handle 10 has come to rest in a position corresponding to closed circuit position of the recloser. It is now proposed to describe how that position was attained.

Normally, the closing operation will be initiated after hub 117 and handle 10 have been rotated counterclockwise approximately 70 degrees from their position in Fig. 10. In order to rotate hub 117 clockwise through 70 degrees it is necessary that pawl 121 engage lug 126. To accomplish this obviously requires that actuator plate 115 be rotated counterclockwise by urging cable 102 upwardly until point 121a picks up or catches lug 126. Then rotation of operating handle in a clockwise direction may be commenced by rotating actuator plate 115 in the same direction by pulling cable 102 outwardly of housing 93. This operation causes catch 121a of pawl 121 to engage lug 126 and rotate it to its clockwise limit. Upon this event, pawl 121 strikes stop 130 causing the pawl to disengage from the lug in opposition to torsion spring 124. Note then that handle 10, spindle 116, and hub 117 are completely disengaged from actuator plate 115 so that no frictional load is impressed on handle 10 other than an infinitesimal load due to the inertia of those three parts, and small bearing friction. Accordingly, eyeleted recloser handle 10 is free to swing counterclockwise with a snap action if the recloser to which it is attached is subjected to an electrical overload.

Assuming that manual tripping of handle 10 is desired, it is necessary to push cable 102 into housing 93. Under this circumstance, actuator plate 115 turns counterclockwise carrying the pawls with it. Point 121a of pawl 121 will freely ride along lower edge 128 of hub 117 and point 122a will catch under lug 127 of hub 117. So it is seen that some lost motion occurs before 122a engages 127, this period constituting a neutral position for the end of cable 102. After point 122a registers with lug 127, continued rotation of plate 115 through urging of cable 102 effects rotation of 117 which in turn trips eyeleted handle 10 by means of rotating spindle 116 and bifurcated arm 20. Further rotation of plate 115 after handle 10 has tripped causes pawl 122 to strike stop 130 so that point 122a and lug 127 are disengaged.

If recloser handle 10 has automatically tripped counterclockwise from its position in Fig. 10 so that lug 126 has turned counterclockwise with respect to point 121a of pawl 121, it is necessary to rotate actuator plate 115 counterclockwise sufficiently to permit point 121a to pick up lug 126 before handle 10 can be restored to closed position shown in the cited figure.

It is seen that the structure just described facilitates manually operating the handle 10 of a recloser from a station as far from the recloser as a practical length of cable 102 dictates. Moreover, it is apparent that the device is positive in action, yet it permits unimpaired automatic operation of the recloser in response to excessive electric currents.

Figure 14:
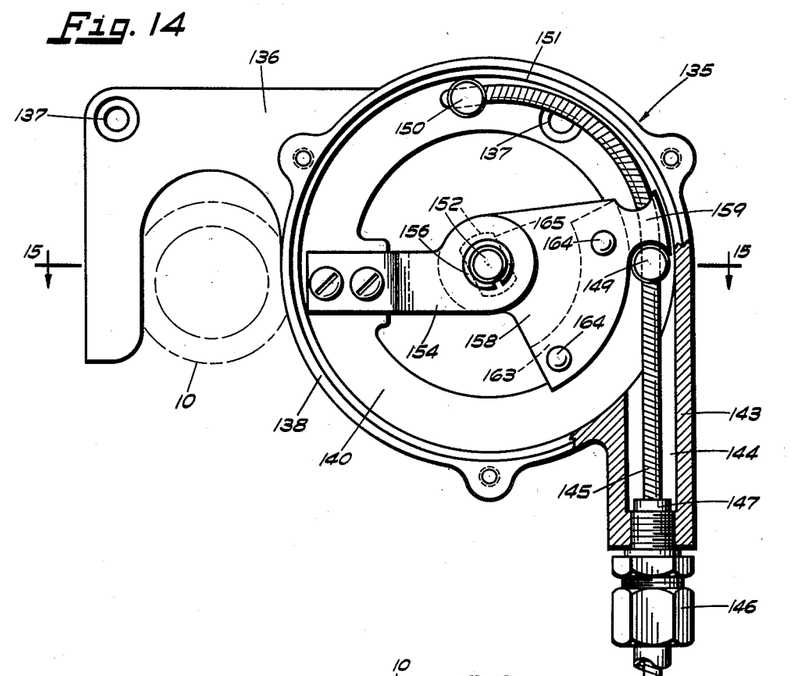
Fig. 14 represents an elevational view of another modification of the invention, partially in section and with parts removed.

A third variation of a free tripping remote control device for attachment to an oil circuit recloser is illustrated in the elevational view of Fig. 14 where it is designated generally by the reference numeral 135. This form of the invention includes, as do the others, a mounting base plate 136 fastenable to the standard sleet hood of a recloser through screw holes 137 and arranged for straddling of recloser handle 10 by a bifurcated actuating arm 20.

A cylindrical housing 138 is preferably die cast integral with mounting plate 136 and a gasketed cover plate 139 is supplied to create a cylindrical chamber 140 for enclosing the movable parts. A neck portion 143 having a bore 144 which communicates with chamber 140 is provided for admitting a flexible control cable 145 capable of transmitting linear forces without kinking. The cable 145 enters bore 144 through a weather tight fitting 146 which sealingly grips the protective sheath 147 but permits the cable to slide freely. A pair of suitable cylindrical knobs 149 and 150 are spaced from each other and secured to cable 145 by sweating them on with solder in a well known manner, although other alternatives such as set screws may be used to secure the knobs. Note that the peripheral surface of each knob 149 and 150 bears against the smooth interior walls 151 of housing 138 so that catching of the knobs within the housing is precluded.

The bifurcated arm 20 coupling the recloser handle 10 to control device 135 is staked onto a spindle shaft 152 which projects centrally into chamber 140 and is journaled in the housing at 153 and in an S-shaped support 154 at 155. A snap ring 156 adjacent support 154 embraces the spindle and prevents its withdrawal from housing 138. A resilient gasket 157 interposed between housing 138 and arm 20 seals out contaminants which may seek to enter the housing along spindle 152.

Figure 15:
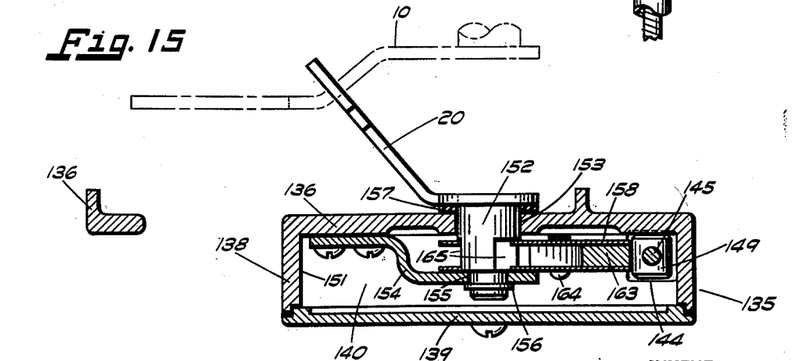
Fig. 15 is a sectional view taken on the line 15—15 of Fig. 14.

A lost motion connection is made between flexible cable 145 and spindle 152 through medium of a sector 158 which is formed of a symmetrical blank bent at its midpoint to form a spaced apart lug 159 closed at its end and permitting free passage for cable 145 between its sides. A segmental arcuate spacer 163 having a thickness slightly in excess of the cable diameter is held within the sector by rivets 164 to enhance rigidity of sector 158 and maintain clearance between the lug 159 and cable 145. Sector 158 is positively affixed for rotation with spindle 152 by placing the former on flattened portion 165 of the latter.

Assuming that it is desired to trip eyeleted recloser handle 10 counterclockwise, it is merely necessary to urge cable 145 into housing 138 by pushing upwardly on a remote control handle such as 11 of Fig. 1 so that knob 149 reacts against lug 159 causing the lug 159 and spindle 152 to rotate counterclockwise until handle 10 trips.

If recloser handle 10 is automatically actuated in a counterclockwise direction as a result of an electrical overload, it may swing freely because lug 159 will pass freely along cable 145 in a counterclockwise direction. Hence, the burden placed on recloser handle 10 by remote control device 135 is infinitesimal.

It should be noted that Fig. 14 illustrates device 135 while in neutral position, that is, where knob 150 is displaced from lug 159 so that the latter may swing unretarded toward the former. To enable automatic operation of handle 10 device 135 must always be restored to this condition by inserting control handle 11 in neutral slot 12 of handle bracket 13 in Fig. 1.

After eyeleted recloser handle 10 has tripped by its own volition the recloser may be reset by merely pulling downwardly on cable 145 so that knob 150 abuts lug 159 and urges it and handle 10 in a clockwise direction. The device is then restored to neutral and is ready for automatic or manual operation again.

Figure 16:
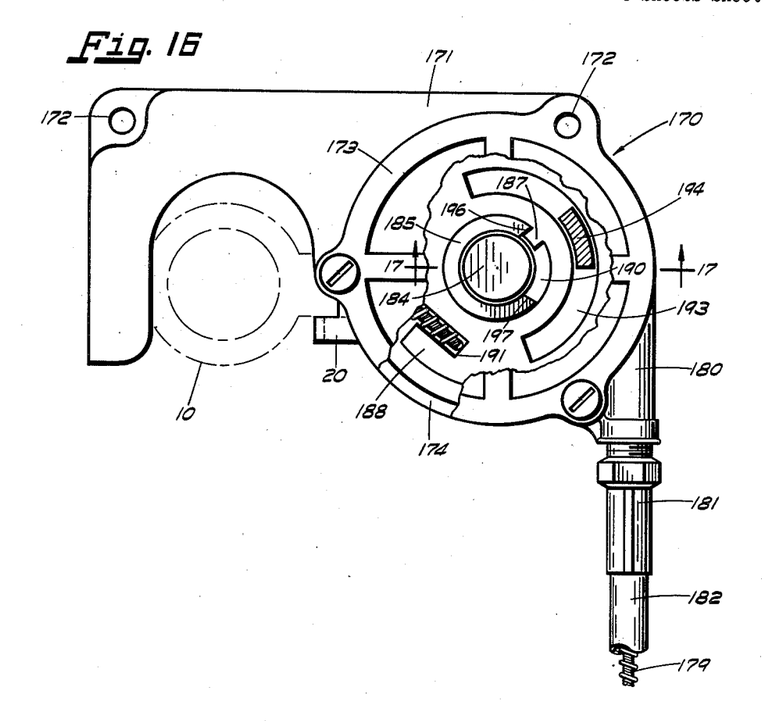
Fig. 16 represents an elevational view of another modification of the invention, partially in section and with parts removed.
Figure 17:
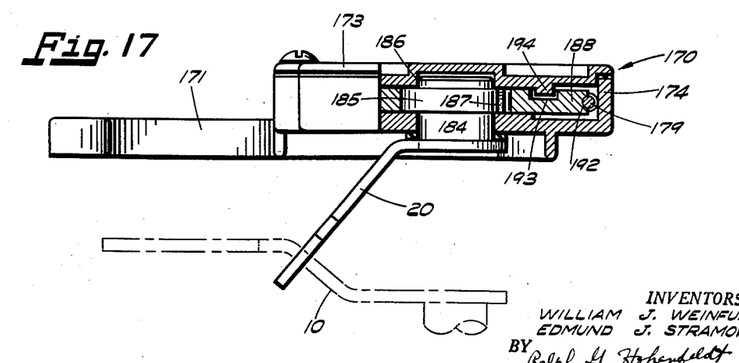
Fig. 17 is a sectional view taken on the line 17—17 of Fig. 16.

A fourth form of the invention is illustrated in Figs. 16 and 17 and is seen to be closely analogous structurally and operationally to the embodiment depicted in Fig. 3. Here the device is designated generally by reference numeral 170. It comprises a mounting plate 171 fastenable to a recloser in proximity with its operating handle 10 by means of screw holes 172. A cover 173, partly broken away, is shown in Fig. 16 fastened to a housing 174 preferably die-cast integrally with mounting plate 171.

A flexible non-kinking operating cable 179 is admitted to housing 174 through a hollow neck 180 to which is fastened a threaded adapter 181 which sealingly seizes cable protective sheath 182 although it permits free sliding of cable 179 therethrough.

A spindle 184 is provided for transferring torsional force from the interior of housing 174 to the exterior. A bifurcated arm 20 is pressed onto spindle 184 and a gasket is placed between housing 174 and the arm to seal out contaminants. As can be seen clearly in Fig. 17, spindle 184 is journaled in housing 174 on one portion and supported at its end portion in a bearing recess 186 in cover 173.

A lost motion connection is effected between a spindle 184 and cable 179 through intermediate mechanism which includes an annular collar or hub 185 fit onto the spindle or turned integral therewith as desired. Hub 185 has a circumferential recess 190 into which projects a tongue 187 carried by a sector plate 188. Sector plate 188 is in turn journaled directly on hub 185 but is limited in rotation relative thereto by coaction of the tongue 187 and recess 190.

Cable 179 is positively engaged to sector 188, as is similarly shown in the preferred embodiment of Fig. 3, by means of grooving 192 conforming in cross section with the configuration of cable 179 and the end of the cable is anchored in a slot 191 in sector 188 to facilitate assembly and to preclude the cable from snagging within housing 174.

For preventing the cable 179 from inadvertently dropping out of the housing 174 when arm 20 is detached from eyeleted recloser handle 10, sector plate 188 is provided with a substantially semi-circular channel 193 into which a stop pad 194 projects from cover 173. Obviously, the sector 188 can only rotate within limits established by channel 193.

Operation of the structure shown in Figs. 16 and 17 is analogous to the embodiment of the invention described hereinbefore with respect to Fig. 3. In Fig. 16 eyeleted recloser handle 10 is shown in neutral position poised to trip counterclockwise in response to an electrical overload through the recloser. Note that tongue 187 is bearing against end 196 of recess 190 so that hub 185 is perfectly free to rotate counterclockwise when the handle 10 does likewise without any impediment, because of the lost motion connection. After handle 10 swings to its lowermost counterclockwise position, for example, about 70 degrees below horizontal, end 197 of recess 190 in the hub will nearly strike tongue 187. Upon this event, recloser handle 10 may be restored to its position in Fig. 16 by merely pulling downwardly on cable 179 through operating handle 11 (see Fig. 1) thereby causing tongue 187 to drive against end 197 and to rotate hub 185 clockwise until restored to the illustrated position. Tongue 187 is then returned to abutment with end 196 by raising operating handle 11 to neutral in slot 12.

Manual opening of the recloser is accomplished just as easily by pushing upwardly on cable 179 through handle 11, thereby causing tongue 187 to act directly on end 196 of recess 190 so that hub 185 and handle 10 immediately begin counterclockwise rotation.

In the foregoing specification a number of distinct structures have been described all of which are capable of being used in conjunction with an oil circuit recloser or any other electrical equipment which has an operating lever manually actuable in one direction of rotation, but which must be freely self returnable in the opposite direction of rotation, and each modification of the invention embraces a novel combination which effects a lost motion connection to accomplish that result. It is appreciated that the copious disclosure may suggest other means for accomplishing the same result. However, although only preferred means are described, the invention is to be limited only by the scope of the following claims.

It is claimed:

1. In combination with a circuit recloser having a control element forcibly operable in two directions of rotation and freely self returnable in one direction of rotation, means for operating said element from a remote position, said means comprising a housing mountable on said apparatus in proximity with the operable element, a spindle journaled in said housing and having a portion projecting exteriorly therefrom and a portion disposed interiorly of the housing, coupling means carried by the exterior portion of said spindle and connecting it with the operable element, cable means extending from the housing to a position remote therefrom, motion translating mechanism interposed between said cable means and spindle, said cable means being adapted for movement through first, neutral and second translatory positions said translating mechanism comprising a lost motion connection including a selectively directional driving member engaged with and rotatable upon movement of said cable means, a driven member embraced by said driving member and having spaced radial shoulder means projecting into the path of said driving means alternately connecting said cable means with said driven means, by contacting one of its shoulders, for actuation of the driven means to a first angular position in one direction and permitting unrestrained return thereof to a second angular position when said cable means has been restored to neutral position and when said other shoulder is contacting said driving means, operating handle means attached to said cable means at an end remote from said circuit recloser, and guide means for said handle means including means with which said handle registers corresponding with neutral position thereof.

2. In combination with a group of circuit reclosers located in positions remote from their operating station, each recloser having a control element forcibly operable in two directions of rotation and freely self returnable in one direction of rotation, means associated with each individual recloser for operating said element from a remote position, said means comprising a housing mounted on each recloser in proximity with its operable element, a spindle journaled in said housing, said spindle having a portion extending exteriorly thereof and a portion disposed interiorly of the housing, coupling means carried by the exterior portion and connected with the operable element, cable means extending from the housing to a position remote therefrom, said cable means being adapted for movement through first, neutral and second translatory positions, motion translating mechanism interposed between said cable means and spindle, said translating means comprising a lost motion connection including a selectively directional driving member engaged with and rotatable upon movement of said cable means, a driven member embraced by said driving member and having radial spaced shoulder means projecting into the path of said driving means alternately connecting said cable means with said driven means for actuation of said driven means, by contacting one of its shoulders, to a first angular position in one direction and permitting unrestrained return thereof to a second angular position when each of said cable means has been restored to neutral position and when the other of its shoulders is contacting said driven means, and an equalizer assembly for operating all of the reclosers simultaneously from an operating station, said assembly comprising an enclosure admitting a number of cables corresponding to the number of reclosers, an equalizing plate within said enclosure, elongated stud means fitting through clearance holes in said equalizing plate and extending on either side thereof, coupling means for connecting an end of each stud to a respective cable, retaining means at the other end of each stud, resilient means disposed between opposite sides of said equalizing plate and said coupling and retaining means respectively, and operating means for urging said equalizing plate and said cables in either of two directions of translation, said operating means including a shaft projecting freely through said plate and collar means for retaining said shaft in substantially fixed position with respect to said equalizing plate, handle means fastened to said operating means, and guide means including means with which said handle registers corresponding with the neutral position thereof.

3. In combination with a circuit recloser having a control element forcibly operable in two directions of rotation and freely self returnable in one direction of rotation, means for operating said element from a remote position, said means comprising a housing mountable on said apparatus in proximity with the operable element, a spindle journaled in said housing and having a portion projecting exteriorly therefrom and a portion disposed interiorly of the housing, coupling means carried by the exterior portion of said spindle and connecting it with the operable element, a flexible cable extending from said housing to a position remote therefrom, motion translating mechanism interposed between said cable and said spindle, said cable means being adapted for movement through first, neutral and second translatory positions, said translating mechanism comprising a lost motion connection including a driving member frictionally engaged by said cable for rotation about the axis of said spindle, circumferentially spaced lug means carried by said driving member, driven means affixed to said spindle and projecting freely interjacent the spaced lug means for alternately urging said driven member rotationally in either direction in response to corresponding directions of translatory movement by said cable, manual control handle means attached to said cable at a station remote from said recloser, said control means rotating one of said lug means into a first angular position against said driven means and returning said lug means to a neutral position whereupon said same lug means is in free spaced relation to said driven means, said control means also being adapted to rotate said other lug means to a second position against said driven means and position indicating means adjacent said control handle means including means with which said manual control means may register to indicate the position of said driving member.

4. In combination with a circuit recloser having a control element forcibly operable in two directions of rotation and freely self returnable in one direction of rotation, means for operating said element from a remote position, said means comprising a housing mountable on said apparatus in proximity with the operable element, a spindle journaled in said housing and having a portion projecting exteriorly therefrom and a portion disposed interiorly of the housing, coupling means carried by the exterior portion of said spindle and connecting it with the operable element, a flexible cable extending from said housing to a position remote therefrom, said cable being adapted for movement through first, neutral and second translatory positions, motion translating mechanism interposed between said cable and said spindle, said translating mechnaism comprising a lost motion connection including a driving member frictionally embraced by said cable and having a central bore defining a bearing journaled on the spindle and having an elongated arcuate aperture contiguous with said bore defining first and second spaced shoulders, pin means affixedly carried by said spindle projecting interjacent said shoulders, a stop member affixed to the housing and projecting into an arcuate channel disposed in the driven member concentrically with its axis for limiting the angular movement of said driving member, the spaced shoulders on said arcuate aperture alternately abutting the pin means on said spindle for rotational movement of the latter in either direction in response to corresponding directions of translatory movement by said cable, an operating handle connected to the cable at its remote position, bracket means slidably supporting said handle for selective movement of said cable in either direction from a neutral position, where said first shoulder is spaced from said pin means, to a first position where said second lug means drives said pin means in one direction and to a second position where said second shoulder drives said pin means, and means in said bracket with which said handle means may register to indicate said neutral position.

5. In combination with a circuit recloser having a control element forcibly operable in two directions of rotation and freely self returnable in one direction of rotation, means for operating said element from a remote position, said means comprising a housing mountable on said apparatus in proximity with the operable element, a spindle journaled in said housing and having a portion projecting exteriorly therefrom and a portion disposed interiorly of the housing, coupling means carried by the exterior portion of said spindle and connecting it with the operable element, a flexible cable extending from the housing to a position remote therefrom, motion translating mechanism interposed between said cable and said spindle, said translating mechanism comprising a lost motion connection including a driven member affixed on said spindle and a driving member journaled thereon and in frictional engagement with said cable, lug means carried by one of said members, pawl means carried by the other of said members and biased toward engagement with said lug means for affecting alternate directions of rotation in response to alternate directions of translation of said cable, stop means affixed in the path of circumferential movement of said pawl means for disengaging said pawl means from said lug means upon attainment of a predetermined angular position by said driven member following rotation thereof in either of two directions.

6. In combination with a circuit recloser having a control element forcibly operable in two directions of rotation and freely self returnable in one direction of rotation, means for operating said element from a remote position, said means comprising a housing mountable on said apparatus in proximity with the operable element, a spindle journaled in said housing and having a portion projecting exteriorly therefrom and a portion disposed interiorly of the housing, coupling means carried by the exterior portion of said spindle and connecting it with the operable element, a flexible cable extending from the housing to a position remote therefrom, motion translating mechanism interposed between said cable and said spindle, said translating mechanism comprising a lost motion mechanism including a substantially circular hub member fixed on said spindle and having circmuferentially spaced lug means spaced about the periphery thereof, a driving member journaled on said spindle adjacent said hub and in frictional engagement with said cable, a pair of pawls pivotally carried on the driving member and biased toward engagement with the driven member for affecting alternate directions of rotation in response to alternate directions of translation of said cable, stop means affixed in the path of circumferential movement of said pawls for disengaging said pawls from said lug means upon attainment of a predetermined angular position following rotation thereof in either of two directions.

7. In combination with a circuit recloser having a control element forcibly operable in two directions of rotation and freely self returnable in one direction of rotation, means for operating said element from a remote position, said means comprising a housing mountable on said apparatus in proximity with the operable element, a spindle journaled in said housing and having a portion projecting exteriorly therefrom and a portion disposed interiorly of the housing, coupling means carried by the exterior portion of said spindle and connecting it with the operable element, a flexible cable extending from the housing to a position remote therefrom, motion translating mechanism interposed between said cable and said spindle, said cable means being adapted for movement through first, neutral and second translatory positions, said translating mechanism comprising a lost motion connection including a driving member frictionally engaged by said cable and rotatable about the axis of said spindle, a driven hub member affixed on said spindle and having an elongated recess in its peripheral margin defining circumferentially spaced shoulders, driving means carried by said driving member and projecting into said recess freely interjacent said shoulders alternately connecting said driven member, by contacting one of its shoulders, with said driving member for rotation of the driven member to a first angular position in one direction and permitting unrestrained return thereof to a second angular position when said cable means has been restored to neutral position and when said other shoulder is contacting said driving means, operating handle means attached to said cable means at an end remote from said circuit recloser, and guide means for said handle means including means with which said handle registers corresponding with neutral position thereof.

8. In combination with a circuit recloser having a control element forcibly operable in two directions of rotation and freely self returnable in one direction of rotation, means for operating said element from a remote position, said means comprising a housing mountable on said apparatus in proximity with the operable element, a spindle journaled in said housing and having a portion projecting exteriorly therefrom and a portion disposed interiorly of the housing, coupling means carried by the exterior portion of said spindle and connecting it with the operable element, a flexible cable extending from the housing to a position remote therefrom, said cable being adapted for movement to first, neutral and second translatory positions, motion translating mechanism interposed between said cable and said spindle, said translating mechanism comprising a lost motion connection including a driving member carried by the cable and movable therewith, a driven member affixed to said spindle and projecting radially therefrom, a lug on said driven member disposed in the path of movement of said driving member, said lug being engageable by said driving member for urging said driven member to a first angular position corresponding with a first translatory position of said cable and said driven member being releasable to spaced relation with said lug corresponding with neutral translatory position and said lug being engageable by said driving member for urging said driven member to a second angular position, operating handle means attached to said cable at an end remote from said circuit recloser, and guide means for said handle means including means with which said handle registers corresponding with neutral position thereof.

9. In combination with a circuit recloser having a control element forcibly operable in two directions of rotation and freely self returnable in one direction of rotation, means for operating said element from a remote position, said means comprising a housing mountable on said apparatus in proximity with the operable element, a spindle journaled in said housing and having a portion projecting exteriorly therefrom and a portion disposed interiorly of the housing, coupling means carried by the exterior portion of said spindle and connecting it with the operable element, a flexible cable extending from the housing to a position remote therefrom, said cable being adapted for movement through first, neutral and second translatory positions, motion translating mechanism interposed between said cable and said spindle, said translating mechanism comprising a lost motion connection including a pair of driving members spaced longitudinally along the cable and movable therewith, a driven member affixed to said spindle and projecting radially therefrom, lug means carried by said driven member and arranged to project interjacent the driving members in their path of movement, said lug being engageable by alternate driving members for urging said driven member toward either of two angular positions corresponding with first and second translatory positions of said cable and to neutral position whereupon one of said driven members is in spaced relation with said lug, operating handle means attached to said cable at an end remote from said circuit recloser, and guide means including means with which said handle registers corresponding with neutral position thereof.

References Cited in the file of this patent

UNITED STATES PATENTS

| | | |
|---|---|---|
| 1,390,040 | Keesey | Sept. 6, 1921 |
| 1,627,964 | Galloway | May 10, 1927 |
| 1,636,262 | Troendly | July 19, 1927 |
| 1,698,490 | Bovey | Jan. 8, 1929 |

FOREIGN PATENTS

| | | |
|---|---|---|
| 330,589 | Germany | Dec. 18, 1920 |
| 361,801 | Great Britain | Nov. 26, 1931 |